United States Patent [19]

Le Quesne et al.

[11] Patent Number: 5,019,363

[45] Date of Patent: May 28, 1991

[54] PROCESS FOR HYDROMETALLURGICAL TREATMENT OF AN INDIUM CHLORIDE SOLUTION

[75] Inventors: Yves Le Quesne, Paris; Paolo Fossi, Elancourt, both of France

[73] Assignee: Metaleurop S.A., Fontenay-Sous-Bois, France

[21] Appl. No.: 391,531

[22] PCT Filed: Nov. 24, 1988

[86] PCT No.: PCT/FR88/00573

§ 371 Date: Jul. 19, 1989

§ 102(e) Date: Jul. 19, 1989

[87] PCT Pub. No.: WO89/04877

PCT Pub. Date: Jun. 1, 1989

[30] Foreign Application Priority Data

Nov. 24, 1987 [FR] France ................................ 87 16290

[51] Int. Cl.$^5$ ................................................. C22B 3/38
[52] U.S. Cl. .......................................... 423/87; 423/98; 423/112
[58] Field of Search ............................ 423/112, 87, 98

[56] References Cited

U.S. PATENT DOCUMENTS

| | | | |
|---|---|---|---|
| 3,180,812 | 4/1965 | Beau | 204/104 |
| 4,292,284 | 9/1981 | Tomii et al. | 423/112 |
| 4,372,922 | 2/1983 | Fossi et al. | 423/112 |
| 4,525,333 | 6/1985 | Schimmel et al. | 423/112 |

FOREIGN PATENT DOCUMENTS

| | | |
|---|---|---|
| 1218237 | 2/1987 | Canada . |
| 3235693 | 4/1983 | Fed. Rep. of Germany ...... 432/112 |
| 2317366 | 2/1977 | France . |
| 0008992 | 3/1980 | France . |
| 1171656 | 11/1969 | United Kingdom . |

*Primary Examiner*—Melvyn J. Andrews
*Attorney, Agent, or Firm*—Fleit, Jacobson, Cohn, Price, Holman & Stern

[57] ABSTRACT

A process for the hydrometallurgical treatment of an indium chloride solution and at least one element selected from the group consisting of tin and antimony comprises the following steps: a) adjustment of the free chloride ion content by addition of alkaline or alkaline earth chloride or a mixture thereof and of their acidity by the addition of hydrochloric acid; b) bringing said indium chloride solution into contact with an organic phase containing dry trialkyl phosphate; c) extraction of said organic phase by bringing the latter into contact with a 0.1 to 3 N hydrochloric acid solution to obtain an indium chloride solution; d) basic extraction using an alkaline metal hydroxyde. Application to extractive metallurgy and recovery of indium and accompanying elements.

12 Claims, No Drawings

PROCESS FOR HYDROMETALLURGICAL TREATMENT OF AN INDIUM CHLORIDE SOLUTION

The present invention relates to the recovery of indium and possible related elements contained in a solution of chlorides of indium and various other elements and particularly tin chloride and antimony chloride; it particularly relates to the separation of tin and antimony from indium.

The development of novel applications for indium, among which may be mentioned the compounds III-V, conductive transparent films used in displays and in photovoltaics and the mixed indium-tin oxides which allow the greenhouse effect to be trebled, has made the recovery of this element particularly attractive, it often being found associated with ores of the common non-ferrous metals, particularly blend, chalcopyrite and galena.

The recovery from a sulphate solution has already been the subject of numerous studies and patents, particularly the French Patent Application published under the number 2,435,533.

It happens that in the course of pyrometallurgical processes indium accumulates in various phases which may readily be subjected to chlorinated dissolution, with or without oxidation, to give a solution of indium chloride. Certain solutions of metallic chloride, such as those which are produced by the process described in the French Patent 2,317,366, may contain indium which it may be opportune to recover.

The separation of indium from tin and antimony, elements to which it is chemically similar, is known technically but the solutions which have been proposed are not satisfactory and are expensive to use. In particular, extractions have been proposed using organic compounds of the ether type or of the ketone type; more particularly, numerous studies have been based on methyl isobutyl ketone.

However, all these products are volatile and present fire risks and explosion risks which are not negligible.

For this reason one of the objects of the present invention is to provide a process for the hydrometallurgical treatment of a solution of indium chloride, which may be mixed with tin chloride or antimony chloride, which uses an extractant which should not be inflammable or explosive.

Another object of the present invention is a process which allows a good separation of indium chloride from antimony chloride and that of tin.

These objects, and others which will appear subsequently, are achieved by means of a process for the hydrometallurgical treatment of a solution of indium chloride and at least one element selected from the group comprising tin and antimony, characterized in that it comprises the following steps:

a) adjustment of the concentration of free chloride ion by addition of a chloride of an alkali metal or a chloride of an alkaline earth metal or a mixture of these and adjustment of their acidity by addition of hydrochloric acid;

b) bringing the said solution of indium chloride into contact with an organic phase comprising trialkyl phosphate;

c) reextraction of the said organic phase by bringing the latter into contact with a solution of 0.1 to 3N hydrochloric acid, to obtain a solution of indium chloride;

d) basic reextraction using an alkali metal hydroxide.

The adjustment of the concentration of chloride ion and acidity is important because it is desirable to extract essentially all the refinable elements and because the concentration of chloride ion and the acidity have a very great influence on achieving this recovery using trialkyl phosphate Preferably, the concentration of free chloride ion is adjusted to a value in the range 3 to 12N and the acidity to a value in the range 1 to 6N. This adjustment is preferably made using calcium chloride; a particularly advantageous range is a solution of indium chloride which contains in addition 5 to 10N chloride ions preferably in the form of calcium chloride and 1 to 3N acidity. Generally the conditions are within the median values of these brackets.

"Free chloride ion" is understood to mean chloride ions which are not associated with an element whose extraction is desired, using trialkyl phosphate, in the form of an uncharged complex (for example $InCl_3$, $HInCl_4$ and so on); generally speaking, free chloride ions associated with hydrochloric acid or with alkali metals or alkaline earth metals are considered as free chloride ion. Within the scope of the present invention ammonium ions will be counted as alkali metal ions.

With the aim of better controlling the liquid-liquid extraction, both with regard to the level of viscosity and to chemical properties, it is desirable that the trialkyl phosphate should be dissolved in aromatic hydrocarbons; generally aromatic hydrocarbons are selected from petroleum fractions having high boiling points and high ignition points, such as the type sold under the trade name Solvesso 150. Generally, for economic reasons, tributyl phosphate is used as the trialkyl phosphate, better known by the abbreviation of its letter symbol in English TBP.

The organic phase preferably contains from 20 to 60%, advantageously from 30 to 50% of trialkyl phosphate by volume.

One of the objects of the present invention is to recover, with the highest possible yield, the metal values contained in the chloride solution while being as selective as possible with regard to impurities. As described above good extraction using trialkyl phosphates can be achieved by controlling the levels of chloride and acid in the solution. As for selectivity, apart from the usual techniques particularly that consisting in increasing the number of extraction stages, it is achieved by adjusting the quantity of trialkyl phosphate which is placed in contact with the solution to be extracted, taking account of the fact that the complexes formed between trialkyl phosphate and the chloride complex to be extracted require three molecules of phosphate for a single atom of the element to be extracted, under usual conditions.

Taking into account that tributyl phosphate, subsequently designated by the letter symbol in English TBP, is the most commonly used and the most economical trialkyl phosphate, TBP will serve in the rest of the description as the paradigm of this family.

Thus, the equations for extraction of tin and indium are essentially of the type:

| $2H^+ + Sn^{4+} + 6Cl^- + 3\,TBP$ | $H_2(SnCl_6) - 3\,TBP$ |
|---|---|
| $H^+ + In^{3+} + 4Cl^- + 3\,TBP$ | $H(InCl_4) - 3\,TBP.$ |

The principal other species extracted are: $SnCl_4$, 2 TBP; $SnHCl_3$, 3 TBP; $Sn(OH)Cl_3$, 3 TBP; $InCl_3$, 3

TBP; InCl$_4$, 3 TBP. The associated species HCl, TBP and HCl, 2 TBP, are also present.

The reaction with antimony is of the same type and also uses three molecules of TBP. Thus to calculate the stoichiometry, a value of three molecules of TBP will be assumed for one atom of the element to be extracted.

Thus, to achieve good selectivity it is advisable to control the ratio organic phase/aqueous phase (O/A) and the outputs of the different phases, so that the amount of trialkyl phosphate which is put into contact with the said solution of indium chloride and the chloride of at least one element chosen from the group comprising tin and antimony should contain at least between 1 and 1½ times, preferably between 1 and 1.2 times, the stoichiometric quantity necessary for the complete extraction of tin, antimony and indium. When iron III is present at a significant concentration, that is, at a concentration above a value of the order of 1 gram per liter, it is advisable to add to this stoichiometric quantity the stoichiometric quantity necessary to extract iron III, which is solvated by three molecules of TBP.

Generally a value of the order of 10% above the stoichiometric quantity is selected.

The determination of the right proportion within these brackets depends on the temperature, which may vary from ambient temperature to that allowed by safe use of the selected diluent (60°-70° C.), on the degree of dilution, the impurities and a compromise between good recovery and good selectivity.

The intended recovery is preferably greater than 90%, advantageously greater than 95%.

This technique gives satisfactory results when the molar ratio of indium on the one hand, to the sum of antimony and tin on the other hand, is greater than a seventh, advantageously greater than a fifth. When this ratio is less than the values above, it is desirable to eliminate part of the antimony and tin by an extraction prior to the principal extraction which will be based on indium.

This can be carried out by incorporating a step a') in the process, before step b), in which the said solution of indium chloride and at least one element selected from the group comprising tin and antimony is placed into contact with a solution of trialkyl phosphate, the quantity of trialkyl phosphate which is put into contact being less than the stoichiometric quantity necessary for extracting the whole of the tin and antimony, preferably less than 80% of this value. When iron III is present at a significant concentration, that is at a concentration above a value of the order of 1 gram per liter, it is advisable to add to this stoichiometric quantity the stoichiometric quantity necessary to extract iron III, which is solvated by three molecules of TBP. In any case, this quantity must be such that the ratio indium/antimony+tin is within the limits specified above after extraction. In order to avoid changes of acidity when the phases TBP and the indium-containing solutions to be extracted are placed into contact, it is preferable to place these phases in prior contact with a solution of approximately 2N hydrochloric acid.

When arsenic is present to a significant extent in indium-containing solutions it is preferable to adjust the redox potential of the said solution in such a way that the ratio arsenic V/total arsenic is at least equal to 90%, preferably to 95%. Indeed, it is one of the teachings of the present invention, that under the conditions of extraction described in the present application, arsenic V is much less effectively extracted than arsenic III.

The reextraction step c) has a very important influence in achieving a reextraction solution which is lean in tin, antimony and, if appropriate, in iron and other coextracted elements. This step must be carried out in such a way that the final total concentration of chloride ions after reextraction is at least equal to 2N, preferably is in the range 3 to 8N, generally in the region of 5-6N. This final concentration of chloride ions can be controlled either by adjusting the concentration of hydrochloric acid initially present in the reextraction solution, or by adjusting the O/A ratio and adjusting the concentration of indium in the organic phase. It should be noted that, for the purposes of adjusting the concentration of indium in the organic phase the prior extraction step a') has a large effect on the concentration of indium in the organic phase. The solution of indium chloride obtained after reextraction in step c) from the organic phase can be subjected to an extraction by an uncharged organic TBP phase, the O/A ratio being controlled in such a way that there are 2 to 5 times the stoichiometric quantity necessary to extract the whole of the tin which is present in this indium chloride solution.

The following examples, while not presenting any limiting characteristic, are intended to enable specialists to determine easily the operating conditions which it is advisable to use in each particular case.

EXAMPLE 1

A solution of PHA$_{inf}$ is placed in contact with an organic phase containing 40% of TBP and 60% of SOLVESSO 150 (by volume), so as to achieve a ratio of organic phase to aqueous phase of 0.8, in a countercurrent manner within a battery of 5 mixer-settlers. Having reached chemical equilibrium within the battery, an organic phase PHO$_{eff1}$ is obtained whose composition, as well as that of PHA$_{eff1}$, is given below.

In a second step, the organic phase PHO$_{eff1}$ loaded with tin, indium and antimony is placed in contact with an aqueous phase titrating HCl=2N, so as to obtain a ratio O/A=8, under countercurrent conditions within a battery of 4 mixer-settlers. The indium is thus completely reextracted from the organic phase and after reaching chemical equilibrium within the battery, an organic phase PHO$_2$ is obtained and an aqueous reextraction phase PHA$_{eff2}$ concentrated in indium, the respective compositions of which are given in the table below.

In a third step, the organic phase PHO$_{eff2}$ loaded with tin and antimony is placed in contact with an aqueous phase titrating NaOH —4.5N, so as to obtain a ratio O/A=1.5, in a countercurrent manner within a stirred reaction vessel. The antimony and tin are thus completely reextracted and a three-phase mixture is obtained which, after filtration and decanting, gives an organic phase no longer containing any metallic element and recyclable by extraction, an aqueous phase containing sodium PHA$_{eff3}$ rich in tin and a solid cake of sodium antimonate. The composition of PHA$_{eff3}$ is given in the table below.

| Chemical | PHASES | | | | | |
|---|---|---|---|---|---|---|
| species | $PHA_{inf}$ | $PHA_{eff1}$ | $PHO_{eff1}$ | $PHA_{eff2}$ | $PHO_{eff2}$ | $PHA_{eff3}$ |
| Sn (g/l) | 25 | 0.02 | 31.2 | 12 | 29.7 | 44.6 |
| In (g/l) | 7 | 0.02 | 8.7 | 70 | 0 | 0 |
| Sb (g/l) | 2 | 0.004 | 2.5 | 3 | 2.1 | 0.007 |
| Pb (g/l) | 21.4 | 21.4 | 0.002 | 0.001 | 0.002 | |
| Cu (g/l) | 22.0 | 22.0 | 0.002 | 0.016 | 0.002 | |
| Zn (g/l) | 2.0 | 2.0 | 0.034 | 0.3 | 0.002 | |
| $CaCl_2$ (M) | 3 | 3 | | | | |
| $H^+$ (M) | 2 | 2 | | 3.5 | | |
| $OH^-$ (M) | | | | | | 2.5 |

It can be seen from the table above that the molar ratio in $PHA_{inf}$ of indium to tin plus antimony is less than 0.5, that the degree of recovery after extraction is greater than 99%, that the selectivity of the extraction of tin, antimony and indium is largely complete in relation to other extractable elements such as copper and zinc and that the enrichment factor of indium in the re-extraction phase $PHA_{eff2}$ is greater than 20 in relation to tin and greater than 70 in relation to antimony.

EXAMPLE 2

Prior Purging of Tin, Antimony and Iron

The object of the present example is to show the possibility of a selective separation of tin, antimony and iron from indium using the TBP mixture.

A solution whose composition is shown below and titrating HCl 2N and $CaCl_2$ 3M is placed in contact with a TBP-SOLVESSO mixture (40–60% by volume equivalent to 1.4M), under counterflow conditions, within a battery of mixer-settlers in two stages. The ratio O/A is selected in such a way that the quantity of TBP used is that which stoichiometrically fixes the whole of the antimony and iron as well as 80% of the tin. In the present case the ratio O/A is 0.55.

The results are compiled in the table below.

| Elements (g/l) | Sb | Sn | In | Fe |
|---|---|---|---|---|
| Stock solution | 3.1 | 28.5 | 6.4 | 0.48 |
| Depleted solution | 0.1 | 4.4 | 6.3 | 0.05 |
| Loaded solvent | 5.4 | 43.8 | 0.5 | 0.87 |
| Yield from extraction (%) | 97 | 84 | 1.3 | 100 |

The possibility of extracting virtually the whole of the iron and antimony and 84% of the tin without significant extraction of indium is thus confirmed.

EXAMPLE 3

Purification of the Reextraction Solution

The object is to eliminate the tin contained in an acid solution of indium chloride which results from step c) of the process.

During the trial, the aqueous solution is placed in contact with an organic phase TBP 40% SOLVESSO 150 60% under countercurrent conditions in a battery of mixer-settlers in three stages. The ratio O/A is calculated so as to extract virtually the whole of the tin without entraining too much indium. In the present case the ratio O/A is 0.33.

The results are compiled in the table below.

| Elements (g/l) | Sn | In | Sb |
|---|---|---|---|
| Stock solution | 10 | 70 | 1.2 |
| Depleted solution | 0.1 | 68.7 | 0.35 |
| Loaded solvent | 30 | 3.9 | 2.6 |

-continued

| Elements (g/l) | Sn | In | Sb |
|---|---|---|---|
| Yield from extraction (%) | 99 | 2 | 71 |

The possibility of removing tin from a solution of indium chloride is confirmed. At the same time a large part of the contained antimony is eliminated.

The solvent which is thus loaded with tin can be recycled to step b).

We claim:

1. Process for the hydrometallurgical treatment of a solution of indium chloride and at least one element selected from the group consisting of tin and antimony, comprising the following steps:
   a) adjusting the concentration of free chloride ion in said solution to a value within the range of 3 to 12N by addition of a chloride selected the group consisting of a chloride of an alkali metal, a chloride of an alkaline earth metal and a mixture of these, and adjusting the acidity of said solution to a value in the range 1 to 6N;
   b) separating the indium and the at least one element from the adjusted solution obtained in step a) by bringing said adjusted solution into contact with an organic phase comprising trialkyl phosphate, so as to obtain an organic phase containing the indium and the at least one element;
   c) extracting the indium from the organic phase obtained in step b) by bringing said organic phase into contact with a solution of 0.1 to 3N hydrochloric acid so as to obtain a solution of indium chloride;
   d) extracting the at least one element from the organic phase obtained in step c) by bringing into contact said organic phase with an alkaline sodium solution comprising an alkali metal hydroxide.

2. Process according to claim 1, wherein the chloride of step a) is calcium chloride.

3. Process according to claim 1, characterized in that the organic phase is a solution of 20 to 60% by volume of trialkyl phosphate dissolved in an aromatic hydrocarbon.

4. Process according to claim 3, characterized in that the said aromatic hydrocarbon is a petroleum fraction.

5. Process according to claim 1, characterized in that during step a) the chloride concentration is adjusted to a value within the range 3 to 12N and the acidity to a value in the range 1 to 6N.

6. Process according to claim 1, characterized in that the ratio organic phase/aqueous phase and the outputs of the various phases are controlled in such a way that the quantity of trialkyl phosphate placed in contact with the said solution of indium chloride and the chloride of at least one element selected from the group consisting initially of tin and antimony is in the range of 1 to 1½ times the stoichiometric quantity necessary for the complete extraction of tin, antimony and indium.

7. Process according to claim 6, characterized in that the said quantity of trialkyl phosphate is in the range of 1 to 1.2 times the stoichiometric quantity necessary for the complete extraction of tin, antimony and indium.

8. Process according to claim 1, wherein when the molar ratio of indium to the at least one element is lower than a seventh, the process of claim 1 further comprises a step a'), before step b), in which said adjusted solution of indium chloride and the chloride of the at least one element selected from the group consisting of tin and antimony is placed in contact with a solution of trialkyl phosphate, the quantity of trialkyl phosphate which is placed in contact being less than the stoichiometric quantity necessary for the extraction of the whole of the at least one element.

9. Process according to claim 1, characterized in that prior to step b) the said organic phase is placed in contact with a 2N solution of hydrochloric acid.

10. Process according to claim 1, wherein when said solution further consists of arsenic, the redox potential of the said solution of indium chloride and the chloride of the at least one element is controlled in a way such that the ratio arsenic V/total arsenic is at least equal to 90%.

11. Process according to claim 10, characterized in that the redox potential of the said solution of indium chloride and the chloride of the at least one element is controlled in such a way that the ratio arsenic V/total arsenic is at least equal to 95%.

12. The process of claim 1, wherein when the molar ratio of indium to the at least one element is lower than a fifth, the process of claim 1 further comprises a step a'), prior to step b), in which said adjusted solution is placed in contact with a solution of trialkyl phosphate, the quantity of said trialkyl phosphate is less than the stoichiometric quantity necessary for the extraction of the whole of the at least one element.

* * * * *